United States Patent [19]
Shah et al.

[11] Patent Number: 5,826,091
[45] Date of Patent: Oct. 20, 1998

[54] METHOD AND APPARATUS FOR REGENERATING EDGE-SENSITIVE INTERRUPTS

[75] Inventors: Dilip C. Shah, Laguna Hills; Michael Atkinson, Irvine; Kaz Takata, Placentia, all of Calif.

[73] Assignees: Sony Corporation, Tokyo, Japan; Sony Trans Com Inc., Irvine, Calif.

[21] Appl. No.: 697,910

[22] Filed: Aug. 30, 1996

[51] Int. Cl.⁶ ................................................ G06F 13/00
[52] U.S. Cl. ............................................................. 395/733
[58] Field of Search .................................. 395/868, 870, 395/856, 733, 736, 739

[56] References Cited

U.S. PATENT DOCUMENTS 5,459,870  10/1995  Iwasa et al. ............................ 395/734

*Primary Examiner*—Glenn A. Auve
*Attorney, Agent, or Firm*—Blakely, Sokoloff, Taylor & Zafman LLP

[57] ABSTRACT

The interrupt regenerator circuit converts the transition signal caused by a passenger's data entry in an aircraft entertainment system into a triggering signal. The triggering signal triggers a delay element consisting of cascadable one-shot devices. The timing intervals for the outputs of these one-shot devices are programmable through the selection of proper values for the resistors and capacitors. The interrupt signal is de-asserted by the host processor when the host processor responds to the interrupt. The delayed interrupt signal is then gated by the interrupt signal itself to regenerate the interrupt signal to the host processor.

22 Claims, 2 Drawing Sheets

METHOD AND APPARATUS FOR REGENERATING EDGE-SENSITIVE INTERRUPTS

BACKGROUND OF THE INVENTION

1. Field of the Invention

This invention relates to a digital logic circuit. In particular, this invention relates to the regeneration of edge-sensitive interrupts in response to passenger's data entry in an aircraft in-flight entertainment system.

2. Description of Related Art

Aircraft In-Flight Entertainment Systems (IFES) offer entertainment features to passengers for additional level of comfort, convenience and enjoyment. Passenger's now can have access to a variety of information sources and receive entertainment services right at their seats during flight. Typically, a passenger can use a computer interface data entry device to request certain services. Typical data entry devices include keyboard, pointing devices (e.g., mouse, track-ball). Many of these devices are coupled to the host processor which processes the requests. In a typical IFES, the number of passengers requesting services is large and the host processor needs to handle these requests in an efficient manner to minimize passenger's waiting time. Therefore, it is important for the host processor to recognize the requests and respond accordingly. The most popular method for a peripheral device to get attention from the host processor is the computer interrupt.

An interrupt signal is a signal generated by a device requiring service from a connected processor. The interrupt signal represents the occurrence of an event that requires attention and service from the microprocessor. The interrupt signal provides an efficient mechanism that allows a processor to service requests from peripheral devices or other processors in an asynchronous manner. There are typically two types of interrupt signals: edge-sensitive (or edge-triggered) and level-sensitive (or level-triggered). An edge-sensitive signal indicates the occurrence of an event by the transition of the logic level of the signal. A low-to-high transition is referred to as positive-going or leading edge signal. A high-to-low transition is referred to as negative-going or trailing edge signal. A level-sensitive interrupt signal indicates the occurrence of an event by the change of the logic level. The designated level may be low or high. As long as the level is maintained at the designated level, the event is occurring or pending.

It is necessary for a microprocessor to be able to recognize and remember the interrupt signal in order to respond accordingly. For level-sensitive interrupt signals, recognition and remembering is not a problem because the level remains the same after the interrupting event takes place, unless it is negated by an affirmative act such as the resetting of a latch affecting the interrupt signal by the host processor upon the completion of the interrupt service routine. For edge-sensitive interrupt signals, a problem may arise when the processor has too many tasks to perform at the time the interrupt signal occurs as the processor may miss the edge transition representative of the interrupt signal. In addition, when there are many edge-sensitive interrupt signals, it is possible that the processor may miss some of these signals. Missing an interrupt signal may lead to undesirable consequences. For example, a typical IFES may receive several passenger's requests for a popular entertainment program at the same time. The host processor in an IFES may have to respond to such interrupt requests in an efficient manner so that no inconvenient delay is observed.

Therefore, it is desirable to provide a circuit to regenerate the edge-sensitive interrupt signal to avoid the problem of the processor missing the interrupt signal.

SUMMARY OF THE INVENTION

The passenger's data entry is converted to an interrupt signal in an aircraft entertainment system. The interrupt regenerator circuit comprises of a delay element to delay the original interrupt signal for a specified time interval, an acknowledgment circuit to de-assert the original interrupt signal when the host processor responds to the interrupt, and a gating circuit to produce both the original interrupt signal and the delayed version of the original interrupt signal.

The time delay to regenerate the original interrupt signal is adjustable by selecting proper values for the resistors and the capacitors used in the one-shot devices. The gating circuit allows the delayed version of the original interrupt signal to pass through if the acknowledgment circuit does not de-assert the resultant interrupt signal because the host processor misses the interrupt.

By gating the de-assertable original interrupt signal with the delayed original interrupt signal, it is possible to regenerate the original interrupt when the host processor misses the original interrupt signal.

BRIEF DESCRIPTION OF THE DRAWINGS

The objects, features and advantages of the present invention will become apparent from the following detailed description of the present invention in which.

DESCRIPTION OF THE INVENTION

The present invention discloses a method and a circuit for regenerating an interrupt signal converted from a passenger's data entry in an aircraft in-flight entertainment system to provide the interrupted host processor an additional opportunity to respond to the interrupt signal in case the host processor misses the original interrupt signal.

The interrupting device operated by a passenger is connected to an interrupt regenerator to generate an interrupt signal on the processor bus. The passenger's interrupting device, the interrupt regenerator circuit, and the host processor are part of the IFES section which processes the data entry from the passengers. The original interrupt signal produced by the interrupting device is deasserted by an acknowledgment circuit indicating that the host processor has serviced the interrupt request. A delay element delays the original interrupt signal from the interrupting device by a programmable time interval. This delayed version of the original interrupt signal is gated with the original interrupt signal so that if the host processor misses the interrupt and does not de-assert the original interrupt signal, the delayed interrupt signal is passed through as a regenerated interrupt signal. The acknowledgment circuit and the gating circuit work together to condition the regeneration of the original interrupt signal. If the host processor recognizes and responds to the original interrupt signal, the original interrupt signal will not be regenerated. On the other hand, if for some reason, the host processor does not respond to the interrupt for some time period as specified by the delay circuit, the original interrupt will be regenerated and therefore provides the host processor an another opportunity to respond to the original interrupt.

Figure 1:
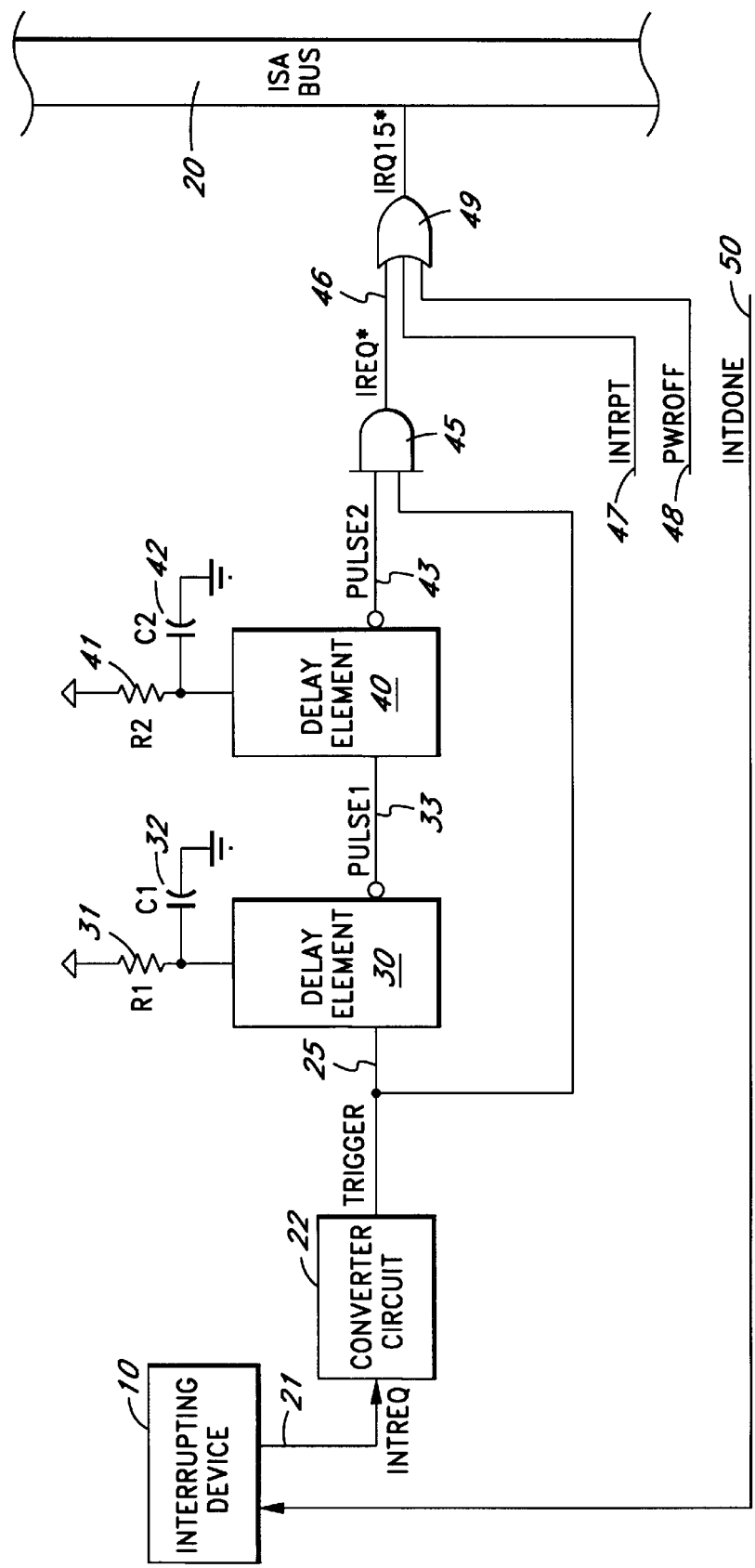
FIG. 1 is a circuit diagram illustrating the present invention.

FIG. 1 is an illustration of one embodiment of the invention. Bus 20 represents the Industry Standard Architecture (ISA) bus having a plurality of interrupt request lines (IRQ*). In this embodiment, IRQ15* is used for illustration. Interrupting device 10 is any device which is operated by a passenger in an aircraft equipped with IFES for data entry. Interrupting device 10 may be a keyboard controller, a passenger's control handset, a pointing device (e.g., mouse, tablet, digitizer, trackball), a communication interface device, a printer, or any device that requires service from the Central Processing Unit (CPU). The services requested may be from a video-on-demand program provided by a media server connected to the host processor. In addition, other control devices such as a passenger's control handset (PCH) may be used to receive the passenger's data entry. A PCH is movable from and retractable into the passenger's seat arm and functions as a pointing device and a game controller. In this embodiment, interrupting device 10 is a keyboard controller coupled to a keyboard. The keyboard is used by passengers to enter request for services. When an interrupting event takes place (e.g., a key is pressed, the movement of a pointing device is detected), interrupting device 10 produces a transition signal INTREQ on line 21. In the present embodiment, INTREQ 21 has an active level of a high-to-low transition. INTREQ 21 is de-asserted (i.e., going from-LOW to HIGH) when the host processor executes a corresponding interrupt service routine.

Signal line INTREQ 21 is buffered and logically conditioned by the converter circuit 22. Converter circuit 22 essentially produces signal TRIGGER on line 25 as a representative of INTREQ which is buffered and qualified using logic gates by other conditions of the system, e.g., system reset, initialization. In the present embodiment, converter circuit 22 is an inverter that inverts INTREQ to produce the proper transition signal TRIGGER 25 to trigger delay element 30. TRIGGER 25 is also used to gate the delayed signal to produce the interrupt signal. Preferably, delay element 30 is a one-shot device that generates a pulse of specified width upon the active transition of TRIGGER 25. In the present embodiment, delay element 30 is the retriggerable monostable multivibrator 74LS123, manufactured by Motorola Inc. Alternatively, delay element 30 may be implemented by a variety of methods. For example, a programmable interval timer at the proper operating mode may work as a one-shot device. Another example is the digital counter. These devices can produce accurate timing control due to the accuracy of the clock source. In the present embodiment, an accurate timing delay is not critical. The interrupting device is a keyboard and a keyboard stroke entered by a human operator has a large timing variation; therefore a one-shot device with RC timing is acceptable. It is readily apparent that other devices, e.g., programmable interval timers, providing greater accuracy can be used if needed.

A timing delay with respect to a transition signal can be easily constructed by producing a pulse whose width is the desirable time delay. The leading edge of the pulse corresponds to the transition signal and the trailing edge of the pulse corresponds to the desired delayed transition signal. The direction of the transition, i.e., positive-going or negative-going, can be easily selected because most one-shot devices have complementary outputs.

In the present embodiment, the pulse width is determined by the RC network consisting of resistor 31 (R1) and capacitor 32 (C1) according to an approximated formula:

$$T = kRC$$

where k is a parameter whose value depends on C. In the present embodiment which uses a retriggerable monostable multivibrator 74LS123, values of k can be selected from a family of curves shown in the data sheet for the 74LS123 (See, Motorola FAST and LS TTL DATA, 4th edition, 2nd printing, 1989, pp. 5–81 to 5–87.).

For the values R1=10K and C1 =10$\mu$F, the value of the parameter k ranges from 0.38 to 0.5 at 25° C., resulting in a pulse width ranging from 38 milliseconds (ms) to 50 ms. This pulse width, or the resulting delay, is reasonable to accommodate the fastest time interval between two consecutive keyboard strokes. The output PULSEI on line 33 of delay element 30 is connected to the input of delay element 40. Delay element 40 is another retriggerable one-shot device that generates a pulse of specified pulse width upon the active transition of PULSEI 33. Like delay element 30, delay element 40 can be implemented by a programmable interval timer or a digital counter. In the present embodiment, the accuracy of the pulse width of PULSE2 is not critical; therefore a one-shot device is acceptable.

The output of delay element 40 is PULSE2 on line 43. The pulse width of PULSE2 is approximately 600 nanoseconds (ns) using the values R2=15K and C2=100 pF. PULSE2 43 is connected to one input of AND-gate 45. The other input of AND-gate 45 is connected to TRIGGER 25. The gating of PULSE2 by TRIGGER 25 serves an important role in the present invention as explained below.

When the host processor processes the interrupt by executing a routine at the specified interrupt service routine address, the completion of the service routine can be physically manifested by an interrupt completion signal. This interrupt completion signal is used to inform the interrupt circuitry that the interrupt is acknowledged and has been processed. In the present embodiment, the interrupting device 10 is a keyboard controller. An example of a keyboard controller is one manufactured by Harris Semiconductor, part no. CDP1871AC. When a key is pressed, the keyboard controller generates the INTREQ signal, transitioning from HIGH to LOW. The time at which the transition takes place is determined by an internal debounce circuitry.

When the host processor executes the corresponding interrupt routine, the processor reads the data in the keyboard controller to determine which key has been pressed. As soon as the data is read, the INTREQ is de-asserted, transitioning from LOW to HIGH. Therefore, the fact that the INTREQ has been LOW and becomes HIGH indicates that the host processor has processed the interrupt and there is no need to regenerate the interrupt again. On the other hand, if INTREQ has been LOW for an unreasonable period of time, say, 10 ms or more, then it is likely that the host processor has missed the interrupt signal and therefore the regeneration of the interrupt signal is necessary. This unreasonable period of time is referred to as the maximum expected response time. Therefore, the INTREQ or its complement, TRIGGER, should be used to gate the delayed interrupt signal such that the regenerated interrupt signal (PULSE2) can be passed through or not depending on whether the portion of INTREQ, after the maximum expected response time, is LOW or HIGH, respectively.

IRQ15* signal on the ISA bus is produced by ORing IREQ* 46, INTRPT 47 and PWROFF 48 by 3-input OR gate 49. INTRPT 47 is the repeat key. INTRPT 47 provides a positive-going transition, after a debounce period, to indicate that a key continues to be pressed even after the data has been read. INTRPT 47 is used for an auto repeat function. PWROFF 48 is also a positive-going signal to indicate that the power has been turned off. For the purpose of this invention, INTRPT 47 and PWROFF 48 serve to show that other edge-sensitive signals can be gated together with IREQ* to produce the composite IRQ15*. OR gate 49 is used because INTRPT and PWROFF are normally LOW signals.

INTDONE 50 is a signal derived from the host processor's response to the interrupt. If the host proand acknowledgees and acknowledges the interrupt, it responds to the interrupt by executing the corresponding interrupt service routine. The interrupt service routine may consist of many tasks related to the service of the interrupt. In addition to carrying out these tasks, the host processor also informs or acknowledges to the interrupting device that it is servicing the interrupt request. An acknowledgment circuit is used to generate an acknowledgment to the interrupting device. This acknowledgment may be an affirmative act or an act implied as part of the tasks in the service routine. An acknowledgment circuit is used to generate an acknowledgment to the interrupting device.

An affirmative act may be an explicit write to or a read from a specified location to set or reset a flag. The host read or write signal may be gated with the address lines corresponding to the specified location to produce the acknowledgment. Alternatively, a host access signal may be gated with an output of an address decoder circuitry which generates an enable signal corresponding to a specified memory or input/output port location.

An implicit acknowledgment can be generated when a specified location is accessed as part of the tasks in the interrupt service routine. For example, in the keyboard interrupt service routine, the host reads the data from the keyboard controller to determine which key has been pressed. The act of reading the keyboard controller is part of the service which could be used as an acknowledgment. In the present embodiment, the Harris Semiconductor keyboard controller CDP1871AC automatically resets the INTREQ line to HIGH when the data is read by the host processor.

Whether the acknowledgment is explicit or implicit, as long as there is a signal coming from the host to indicate that the interrupt is being serviced, this signal serves as an acknowledgment and can be used to gate the IREQ* so that the regenerated interrupt signal can be passed through or masked out as is done by AND gate 45.

Figure 2A:
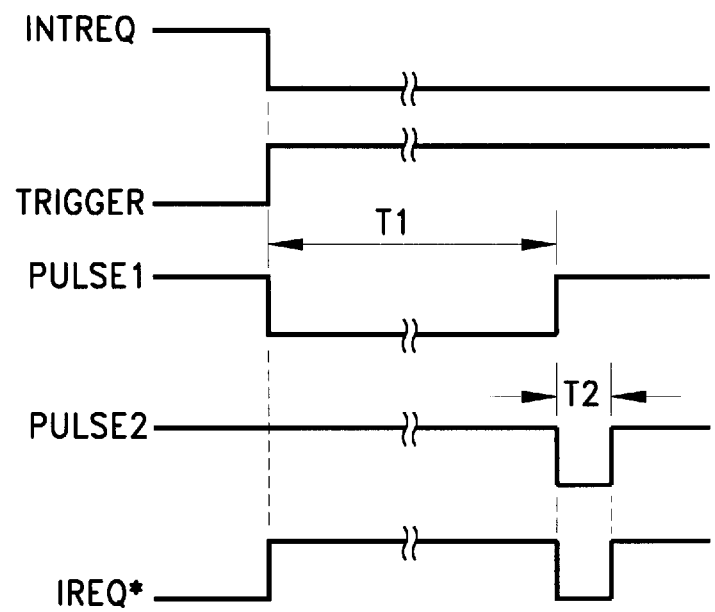
FIG. 2(a) is a timing diagram illustrating the relationship of the relevant wave forms when the host processor misses the interrupt.
Figure 2B:
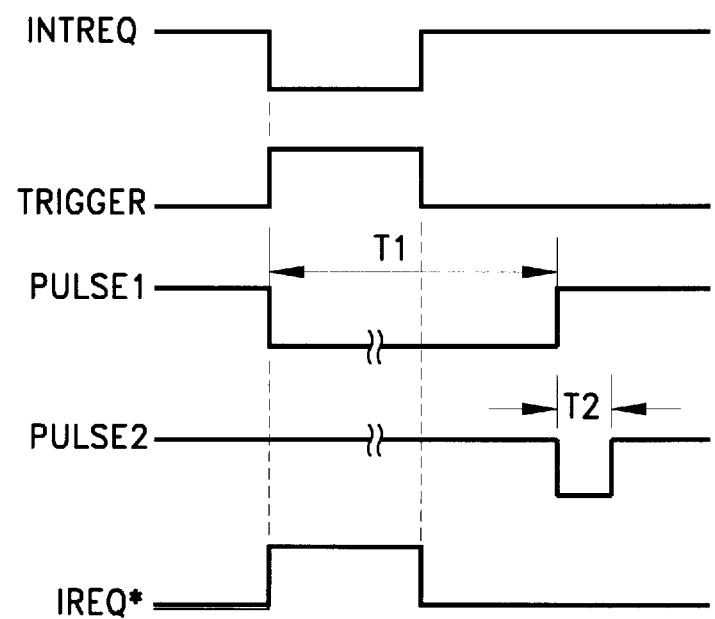
FIG. 2(b) is a timing diagram illustrating the relationship of the relevant wave forms when the host processor recognizes and services the interrupt.

FIGS. 2(a) and 2(b) show a timing diagram illustrating the relationship of these signals. FIG. 2(a) depicts the timing diagram when the host processor misses the original interrupt signal. FIG. 2(b) shows the timing diagram when the host processor acknowledges and services the original interrupt.

Referring to FIG. 2(a), INTREQ is normally HIGH. When the interrupting event takes place, e.g. a key is pressed, INTREQ goes from HIGH to LOW. TRIGGER, being the complement of INTREQ, goes from LOW to HIGH. This positive-going transition triggers delay element 30 to produce PULSEI with pulse width T1 where T1 is approximately 40 ms. The positive-going edge of PULSEI in turn triggers delay element 40 to produce PULSE2 with pulse width T2 where T2 is approximately 600 ns. If the host processor misses the interrupt, then INTREQ remains LOW, or TRIGGER remains HIGH. The ANDing of PULSE2 and TRIGGER produces IREQ*. IREQ* therefore has two positive-going transitions, one corresponding to TRIGGER and one corresponding to PULSE2. Therefore, if the host processor misses the first interrupt edge, it has an opportunity to be interrupted again, approximately 40 ms later.

Referring to FIG. 2(b), PULSEI and PULSE2 are generated the same way as in FIG. 2(a) because once TRIGGER changes from LOW to HIGH, the two one-shot devices are triggered and there is nothing to stop them. However, if the host processor acknowledges the interrupt and executes the interrupt service routine, INTREQ is pulled back HIGH indicating that interrupt has been serviced. TRIGGER is pulled LOW. It is assumed that the time it takes for the host processor to service the interrupt is less than the composite delay time T1+T2=40 ms so that the gating of PULSE2 and TRIGGER masks out the positive-going transition in PULSE2. IREQ* therefore has only one positive-going transition.

In both FIGS. 2(a) and 2(b), the IRQ15* signal on the ISA bus is essentially the same as the IREQ* because INTRPT and PWROFF are assumed LOW in a normal condition.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention. For example, the circuit can be extended to repeatedly regenerate the interrupt signal until reset by the host processor. This can be done by cascading multiple delay elements and gating these delayed signals with appropriate logic circuits.

What is claimed is:

1. In an aircraft entertainment system, an interrupt regenerator circuit for converting a passenger's data entry into an interrupt signal and regenerating an interrupt signal to a host processor from a transition signal asserted by said passenger's data entry, said interrupt regenerator circuit comprising:

a converter circuit to convert said transition signal into a triggering signal;

a delay element coupled to receive said triggering signal, said delay element producing a delayed signal which is delayed by a specified time interval with respect to said triggering signal;

an acknowledgment circuit for de-asserting said transition signal if said host processor responds to said passenger's data entry; and a gating circuit coupled to receive said delayed signal and said triggering signal for producing said interrupt signal, said interrupt signal representing said delayed signal and said triggering signal.

2. The circuit of claim 1 wherein said transition signal is an edge-sensitive signal.

3. The circuit of claim 2 wherein said interrupt signal is an interrupt request signal on an Industry Standard Architecture (ISA) bus.

4. The circuit of claim 1 wherein said delay element consists of at least one retriggerable one-shot device.

5. The circuit of claim 1 wherein said delay element consists of at least one programmable timer.

6. The circuit of claim 1 wherein said delay element consists of at least one digital counter.

7. The circuit of claim 1 wherein said de-asserting said transition signal by said acknowledgment circuit is obtained from a host access to a specified location corresponding to said passenger's data entry.

8. The circuit of claim 1 wherein said gating circuit comprises at least one AND gate having said delayed signal and one of said transition signal and an inverted version of said transition signal as inputs..

9. In an aircraft entertainment system, a method for converting a passenger's data entry into an interrupt signal and regenerating said interrupt signal to a host processor from a transition signal caused by said passenger's data entry, said method comprising:

converting said transition signal into a triggering signal;

delaying said triggering signal by a delay element for a predetermined time period to produce a delayed signal;

de-asserting said transition signal from a response of said host processor acknowledging said passenger's data entry; and gating said delayed signal with said triggering signal to produce said interrupt signal, said interrupt signal representing said delayed signal and said triggering signal.

10. The method of claim 9 wherein said delaying further comprises triggering at least one retriggerable one-shot device.

11. The method of claim 9 wherein said delaying further comprises triggering at least one programmable timer.

12. The method of claim 9 wherein said delaying further comprises a triggering at least one digital counter circuit.

13. The method of claim 9 wherein said de-asserting includes responding to an access of said host processor to a specified location corresponding to said passenger's data entry.

14. The method of claim 9 wherein said gating includes ANDing said delayed signal and one of said transition signal and an inverted version of said transition signal.

15. In an aircraft entertainment system, a system comprising:

a host processor;

an interrupting device which produces a transition signal corresponding to a passenger's data entry; and an interrupt regenerator circuit which converts said passenger's data entry into an interrupt signal to interrupt said host processor, said interrupt regenerator circuit producing a first version of said transition signal and a second version of said transition signal according to whether said host processor responds to said first version of said transition signal.

16. The system of claim 15 wherein said interrupt regenerator circuit comprises a converter circuit, a delay element, an acknowledgment circuit, and a gating circuit.

17. The system of claim 16 wherein said converter circuit converts said transition signal into a triggering signal.

18. The system of claim 17 wherein said delay element receives said triggering signal and produces said delayed signal, said delay element consisting of at least one of a one-shot device, a programmable timer, and a digital counter.

19. The system of claim 17 wherein said acknowledgment circuit de-asserts said transition signal if said host processor responds to said first version of said transition signal.

20. The system of claim 17 wherein said gating circuit is coupled to receive said delayed signal and said triggering signal for producing said interrupt signal, said interrupt signal representing said delayed signal and said triggering signal.

21. The system of claim 15 further comprises a media server coupled to said host processor for providing services in response to said passenger's data entry.

22. The system of claim 15 further comprises a passenger's control handset (PCH) movable from and retractable into a passenger's seat arm, said PCH functioning as a pointing device and a game controller for receiving said passenger's data entry.

* * * * *

UNITED STATES PATENT AND TRADEMARK OFFICE
CERTIFICATE OF CORRECTION

PATENT NO. : 5,826,091
DATED : October 20, 1998
INVENTOR(S) : Shah et al.

It is certified that error appears in the above-identified patent and that said Letters Patent is hereby corrected as shown below:

In column 1 at line 14 delete "Passenger's" and insert --Passengers--

In column 1 at line 24 delete "passenger's" and insert --passengers'--

In column 1 at line 64 delete "passenger's" and insert --passengers'--

In column 2 at line 54 delete "deasserted" and insert --de-asserted--

In column 5 at lines 13-14 delete "proand acknowledgees and acknowledges" and insert --processor recognizes and acknowledges--

In column 7 at line 4 delete "inputs.." and insert --inputs.--

Signed and Sealed this

Twenty-seventh Day of March, 2001

*Attest:*

NICHOLAS P. GODICI

*Attesting Officer*  Acting Director of the United States Patent and Trademark Office